US008875385B2

(12) United States Patent
Hladnik et al.

(10) Patent No.: US 8,875,385 B2
(45) Date of Patent: Nov. 4, 2014

(54) APPARATUS FOR RETAINING A PACKAGE OF LAMINATIONS OF AN ELECTROMAGNETIC CORE IN A DEVICE FOR THE PRODUCTION THEREOF

(75) Inventors: Marko Hladnik, Crni Vrh nad Idrijo (SI); Niko Herakovic, Bizeljsko (SI)

(73) Assignee: Univerza V Ljubljani, Ljubljana (SI)

(*) Notice: Subject to any disclaimer, the term of this patent is extended or adjusted under 35 U.S.C. 154(b) by 176 days.

(21) Appl. No.: 13/504,218

(22) PCT Filed: Oct. 28, 2009

(86) PCT No.: PCT/SI2009/000060

§ 371 (c)(1), (2), (4) Date: Jul. 2, 2012

(87) PCT Pub. No.: WO2011/053258

PCT Pub. Date: May 5, 2011

(65) Prior Publication Data

US 2012/0266456 A1 Oct. 25, 2012

(51) Int. Cl.

*H02K 15/00* (2006.01)
*H01F 41/02* (2006.01)
*B21D 28/22* (2006.01)
*B21D 45/00* (2006.01)
*H02K 15/02* (2006.01)

(52) U.S. Cl.

CPC ............ *H01F 41/0233* (2013.01); *B21D 28/22* (2013.01); *B21D 45/003* (2013.01); *H02K 15/02* (2013.01)
USPC ................................. 29/732; 29/738; 29/739

(58) Field of Classification Search

CPC ...... B21D 28/22; B21D 45/003; H01F 41/02; H01F 41/0206
USPC .................................... 29/732–736, 738, 739
See application file for complete search history.

(56) References Cited

U.S. PATENT DOCUMENTS 2,835,026 A * 5/1958 Saari .............................. 29/714
3,220,568 A * 11/1965 Voyce et al. .................... 29/738

(Continued)

FOREIGN PATENT DOCUMENTS

CN 101542874(A) 9/2009
JP 58073133 A 4/1984

(Continued)

*Primary Examiner* — Peter DungBa Vo
*Assistant Examiner* — Kaying Kue
(74) *Attorney, Agent, or Firm* — Jacobson Holman, PLLC

(57) ABSTRACT

An apparatus for retaining a package of laminations of an electromagnetic core in a device (3) for the production thereof that is mounted into a panel (1) arranged at a distance from a yoke (2) of said device (3) for the production of individual laminations (4) and mutual joining of same into a package (5), wherein it comprises peripheral units like an aggregate for pressurized hydraulic oil, sensors, control unit and ejector. The apparatus of the invention is formed in a way that within said panel (1) a cylinder (7) is arranged co-axially with a sleeve (6) within said yoke (2), said cylinder (7) housing a hydraulic piston (8) with a piston rod (9) with a coaxial drilled hole (12), wherein on the top of said piston (8) adjacent to said sleeve (6) there is a pivotally mounted panel (10) that is simultaneously supported on said piston (8) by a spring (11) and said piston rod (9) is further led within said cylinder (7) at a distance by means of three mutually distant gaskets (14) in order to create two spaces (15) and (16) between said piston rod (9) and said cylinder (7) in that a central section (9*a*) of said piston rod (9) is thinner and that both spaces (15) and (16) are provided with hydraulic connections (17) and (18) for an alternate supply of pressurized oil into one or another space (15) and (16).

2 Claims, 1 Drawing Sheet

(56) References Cited

U.S. PATENT DOCUMENTS

| | | | | |
|---|---|---|---|---|
| 3,665,593 | A * | 5/1972 | Savage | 29/598 |
| 3,683,493 | A * | 8/1972 | Begovich | 29/598 |
| 3,762,041 | A * | 10/1973 | Bair | 29/596 |
| 3,855,798 | A * | 12/1974 | Spairani | 60/585 |
| 3,875,660 | A * | 4/1975 | Kobayashi et al. | 29/609 |
| 3,892,115 | A * | 7/1975 | Mees et al. | 72/294 |
| 4,188,712 | A * | 2/1980 | Burns | 29/596 |
| 4,775,037 | A * | 10/1988 | Stenberg | 188/312 |
| 4,981,199 | A * | 1/1991 | Tsai | 188/312 |
| 5,333,946 | A * | 8/1994 | Goossens et al. | 303/119.2 |
| 5,593,532 | A * | 1/1997 | Falk et al. | 156/285 |
| 5,906,040 | A * | 5/1999 | Kawano et al. | 29/738 |
| 6,523,247 | B2 * | 2/2003 | Mirpuri et al. | 29/596 |
| 6,687,979 | B2 * | 2/2004 | Bucey et al. | 29/727 |
| 8,061,015 | B2 * | 11/2011 | Tokizawa | 29/596 |
| 8,127,429 | B2 * | 3/2012 | Saito et al. | 29/596 |
| 2009/0025203 | A1 * | 1/2009 | Tanaka et al. | 29/596 |
| 2010/0052463 | A1 | 3/2010 | Saito et al. | |
| 2013/0186158 | A1 * | 7/2013 | Myojin | 72/48 |

FOREIGN PATENT DOCUMENTS

| | | | |
|---|---|---|---|
| JP | 61180551 | A | 8/1986 |
| JP | 20032300161(A) | | 8/2003 |
| JP | 2004067322(A) | | 3/2004 |
| JP | 2006026735 | A | 2/2006 |
| JP | 2007007679 | A | 1/2007 |
| WO | WO 00/12902 | | 3/2000 |
| WO | WO2008/065830 | A1 | 6/2008 |

* cited by examiner

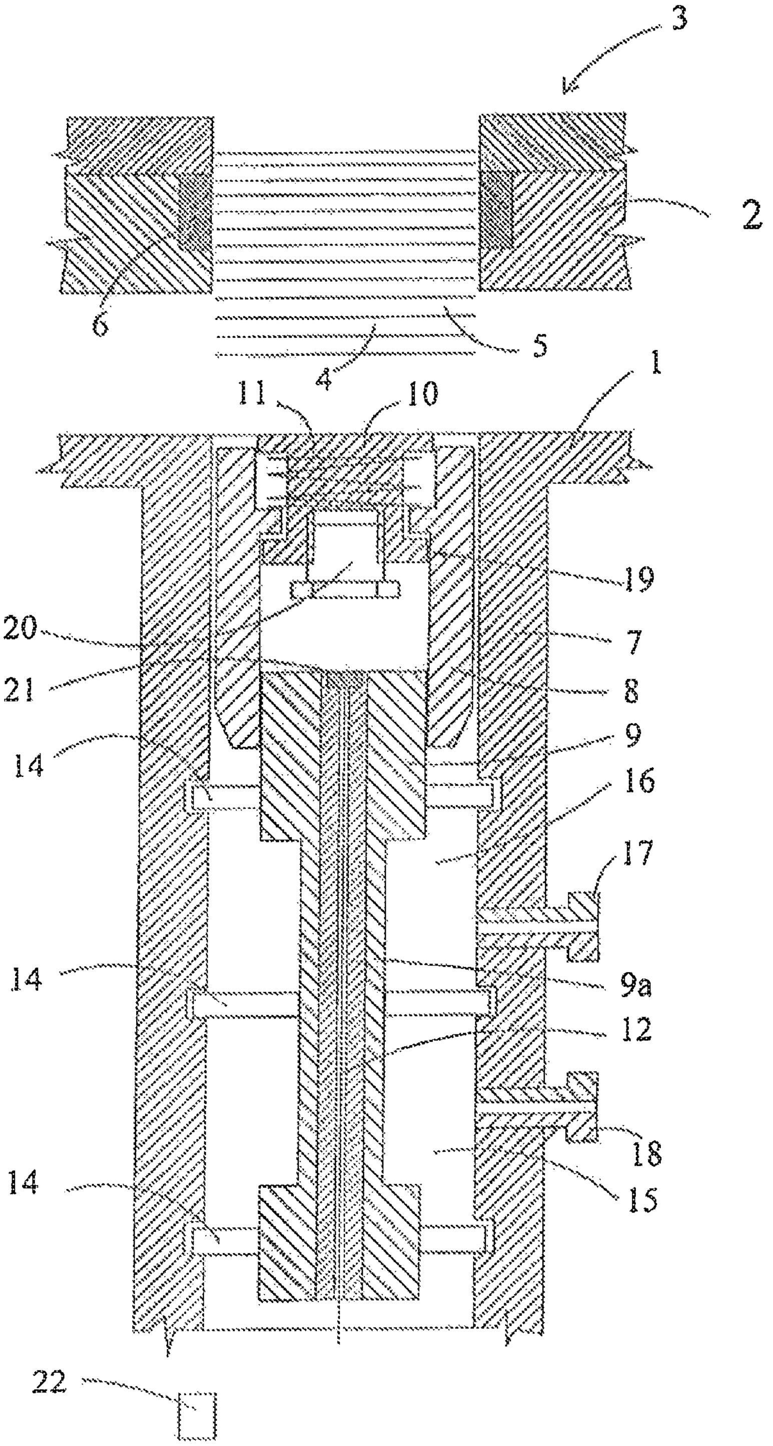
3
2
6
5
4
1
11
10
19
20
7
21
8
9
14
16
17
14
9a
12
18
14
15
22

APPARATUS FOR RETAINING A PACKAGE OF LAMINATIONS OF AN ELECTROMAGNETIC CORE IN A DEVICE FOR THE PRODUCTION THEREOF

This is a national stage of PCT/SI09/000060 filed Oct. 28, 2009 and published in English, hereby incorporated by reference.

SUBJECT OF INVENTION

The subject of the present invention is an apparatus for retaining a package of laminations of an electromagnetic core in a device for the production thereof, e.g. for stators and rotors of electric motors, generators and also for other types of electromagnets.

TECHNICAL PROBLEM

A technical problem solved by the present invention is how to design an apparatus of this type that can be arranged on a machine for the production of the above mentioned packages even in the sense of upgrading, wherein laminations will be joined equidistantly by clamps and such minimum clearance will be present to provide for an optimum formation of an electromagnetic field and regular geometry of a package of laminations.

PRIOR ART

A known device of this type is conceived in the yoke of a die cutter closely under a die plate for cutting an individual lamination in the shape of a sleeve having a reduced cross-section to allow the joined laminations to travel therethrough with such friction that said sleeve offers resistance (counter-force) in further punching of clamps. In order to increase said counter-force, a tube-like guide is arranged at the output side of the die plate, in which fabricated packages of laminations travel, wherein friction is created. A drawback of this solution lies in that possible errors in packages only appear after the packages of laminations have left said guide. This means that the error has been present in a considerable number of packages before it gets noticed. There is huge scrap. Stopping the manufacturing process and a repeated start-up require a relatively long period of time, since the packages have to be manually removed from the area extending from the die plate all the way to the output end of the guide. This represents a burden to the manufacturing process by a high level of scrap and a long period of time needed to rectify the errors, which considerably increases manufacturing costs.

Therefore there is a need to do away with the above-mentioned drawbacks of such apparatus.

SOLUTION TO THE TECHNICAL PROBLEM

The described technical problem is solved by the apparatus of the invention, which is characterised in that there is an adapted retaining apparatus, preferably a hydraulic one, under a known sleeve within a die plate that provides sufficient support in punching clamps into each lamination so that sufficient counter-force is exerted against the force of punching, wherewith high quality joining of laminations by clamps is ensured. As a result there is considerably less scrap. The retaining apparatus of the invention does not hamper pivoting of joined laminations in order to compensate for unequal thickness of an individual lamination, which would otherwise lead to an axially bent package of laminations.

The invention will now be described in more detail by way of an embodiment and the enclosed drawing, showing in FIG. 1 a longitudinal cross-section of the apparatus of the invention.

An apparatus for retaining a package of laminations of an electromagnetic core at a device for the production thereof is arranged at the output of the package of laminations of said core from a sleeve in the yoke of the device in a way that a supporting piston axially moves into said sleeve in a way to support the lower first lamination of the package and after each further lamination is joined, it retreats by the thickness of one lamination and again renders support in the process of punching clamps of a further lamination. After the entire package of the lamination core is finished, the top of the supporting piston lies in the level of a panel, onto which a finished package is displaced transversally by means of a special automatic ejector and the apparatus is ready to render support in the manufacturing of a next package.

An apparatus for retaining a package of laminations of an electromagnetic core in a device 3 for the production thereof is mounted into a panel 1 arranged at a distance from a yoke 2 of said device 3 for the production of individual laminations 4 and mutual joining of same into a package 5. The distance between said panel 1 and said yoke 2 equals or exceeds the height (axial length) of each package 5. Within said panel 1 a cylinder 7 is arranged co-axially with a sleeve 6 within said yoke 2, said cylinder 7 housing a hydraulic piston 8 with a piston rod 9. On the top of said piston 8 there is a pivotally mounted panel 10 providing for the pivoting of a partially fabricated package 5 with the purpose as described above. Said panel 10 is simultaneously supported on said piston 8 by a spring 11 that provides for a proper approach of said piston 8 towards said first lamination 4 of a newly produced package 5, which will be described in more detail in the continuation. Said piston 8 is supported by said piston rod 9 comprising along its centre a drilled hole 12. Said piston rod 9 is further led within said cylinder 7 at a distance by means of three mutually distant gaskets 14 in order to create two spaces 15 and 16 between said piston rod 9 and said cylinder 7. The central section 9*a* of said piston rod 9 is thinner. Hydraulic connections 17 and 18 are connected to both spaces 15 and 16. Said piston rod 9 with said piston 8 moves axially by an alternate supply of pressurised oil into one or another space 15 and 16.

The panel 10 with an adjustment screw 20 supported by said spring 11 is axially led within a guide 19. Simultaneously, a sensor 21 is arranged on the top of said hollow piston rod 9, said sensor 21 detecting the final position, or rather the working abutment of said piston 8 with panel 10 to said first lamination 4 of the fabricated package 5 within said sleeve 6.

Hydraulic oil in both spaces 15 and 16 is produced in an aggregate that is not subject of the invention and is not shown in figures. The control circuit for the supply of oil into said spaces 15 and 16 is not subject of the invention, either. Further sensors 22 on the external part 9*b* of said piston rod 9 for detecting the current position of said piston rod 9 are not subject of the present invention, either. They are needed for the functioning of the control device controlling the movement of the piston rod 9 in accordance with the cycle of die cutting of laminations 4 and arrangement of clamps between each individual adjacent laminations 4 as well as for the determination of the final length of the package 5 and for the final ejection thereof.

The apparatus of the invention functions as follows: hydraulic oil within said space 16 approaches said panel 10 to said first lamination 4 within said sleeve 6. The abutment of said panel 10 against said first lamination 4 is absorbed by said spring 11 that allows said panel 10 to approach said piston rod 9, which keeps moving in axial direction until said adjustment screw 20 touches said sensor 21. At that moment the oil supply is discontinued. Then follows the process of arranging clamps between two adjacent laminations 4 through a punch within an apparatus, which is not subject of the present invention. After this work cycle oil is released from said space 16 and supplied to said space 15, so that said piston rod 9 gets displaced by exactly the thickness of one lamination 4. A further work cycle of arranging clamps on further two adjacent laminations 4 follows. The process is repeated until the entire package 5 is created, which is then ejected by the ejector.

The package 5 so produced is immediately subject to quality control; however the result of the control does not have any influence on the manufacturing cycle of the next package. If an error occurs in the package 5 indicating a malfunctioning of the apparatus of the invention or of the device for the production of packages, work is discontinued immediately. As a result there is a considerably lower number of bad products than with known apparatus. The apparatus is immediately ready for repair. Servicing time is thus shorter, which is also the goal of the present invention.

It is understood that a man skilled in the art can design new embodiments based on his acquaintance with the above disclosure and its embodiments especially in the sense of industrial design and adaptation to individual requirements without circumventing the characteristics of the invention defined in the appended claims.

The invention claimed is:

1. An apparatus for retaining a package of laminations of an electromagnetic core in a device (3) for the production of said package of laminations, said device (3) including a yoke (2) and a sleeve (6) within said yoke (3), said apparatus mounted into a panel (1) that is spaced a distance away from said yoke (2), wherein within said panel (1) a cylinder (7) is arranged co-axially with respect to said sleeve (6), said cylinder (7) housing a hydraulic piston (8) with a piston rod (9) with a coaxial drilled hole (12), wherein on the top of said piston (8) adjacent to said sleeve (6) there is a pivotally mounted panel (10) that is simultaneously supported on said piston (8) by a spring (11), wherein said pivotally mounted panel (10) with an adjustment screw (2) therein is supported by said spring (11) and simultaneously axially led within a guide (19) under which a sensor (21) is arranged on the top of said piston rod (9), said sensor (21) detecting the working abutment of said piston (8) with said pivotally mounted panel (10) to a first lamination of the fabricated package of laminations (5) within said sleeve (6), wherein said piston rod (9) is further led within said cylinder (7) at a distance by means of three mutually distant gaskets (14) in order to create two spaces (15) and (16) between said piston rod (9) and said cylinder (7) in that a central section (9*a*) of said piston rod (9) is thinner and that both spaces (15) and (16) are provided with hydraulic connections (17) and (18) for an alternate supply of pressurized oil into one or another space (15) and (16).

2. Apparatus as claimed in claim 1, wherein the distance between said panel (1) and said yoke (2) equals or exceeds the height (axial length) of each package of laminations (5).

* * * * *

UNITED STATES PATENT AND TRADEMARK OFFICE

CERTIFICATE OF CORRECTION

PATENT NO. : 8,875,385 B2
APPLICATION NO. : 13/504218
DATED : November 4, 2014
INVENTOR(S) : Marko Hladnik et al.

It is certified that error appears in the above-identified patent and that said Letters Patent is hereby corrected as shown below:

On the Title Page, column 1, item (73), add the second assignee of record, --Hidria Rotomatika d.o.o., Spodnja Idrija, (SI)--.

Signed and Sealed this
Twentieth Day of October, 2015

Michelle K. Lee
*Director of the United States Patent and Trademark Office*